3,661,805
METHOD OF MANUFACTURING AN EXTRUDED CATALYST COMPOSITION
Edward Horvath, Hickory Hills, Ill., assignor to Universal Oil Products Company, Des Plaines, Ill.
No Drawing. Filed Nov. 21, 1969, Ser. No. 878,910
Int. Cl. B01j 11/32
U.S. Cl. 252—465                                9 Claims

ABSTRACT OF THE DISCLOSURE

A method for the manufacture of an extruded catalyst composition comprising a Group VI–B metal, a Group VIII metal and a refractory inorganic oxide gel. The Group VI–B and Group VIII metal components are combined with the refractory inorganic oxide gel, said gel being peptized before or after combination wtih the metallic components. The mixture is subsequently treated with an aqueous alkaline reagent to form an extrudable mass of finely divided particles. Upon extrusion, the extrudate is dried and oxidized.

---

This invention relates to the hydrodesulfurization of petroleum hydrocarbon fractions such as residual fuel oils, and to a method for the manufacture of a catalyst composition particularly adapted thereto. It has become well known that oxides of sulfur, plus lesser amounts of other sulfurous compounds, are among the major pollutants of the atmosphere. It has been estimated that, in this country alone, in excess of about 23 million tons of sulfur dioxide has been discharged into the atmosphere on an annual basis. The increasingly deleterious affect of the sulfurous pollutants with respect to cardiorespiratory disease, eye irritation, and the like, has prompted rather severe legislative action to control the amount of sulfur dioxide discharged into the atmosphere, particularly in densely populated areas where the problem is more acute. It has been recognized that the combustion of petroleum products accounts for a substantial portion of said oxides of sulfur and legislation has been effected or proposed which is particularly directed to the limitation of sulfurous compounds in residual fuel oils to be burned in densely populated areas. The supply of residual fuels of suitably low sulfur content is entirely inadequate to meet present day requirements and it becomes increasingly important to develop improved desulfurization techniques to treat the more accessible and abundant residual fuel oils of relatively high sulfur content.

Desulfurization technology is presently concerned with hydrotreating and to the development of catalysts that are more selective and/or operate at less severe conditions to obviate hydrocracking of the residual fuel oil. Hydrotreating, or hydrodesulfurization, is generally effected at hydrodesulfurization reaction conditions including an imposed hydrogen pressure of from about 100 to about 3000 lb./square inch. Normally, the hydrogen is charged together with recycle hydrogen to provide from abut 1000 to about 50,000 standard cubic feet per barrel of hydrocarbon charge. Hydrodesulfurization reaction conditions further include an elevated temperature, usually from about 200° to about 800° F. although temperatures in the higher range, say from about 600° to about 800° F., are most suitable. Also, a sulfur-containing feed stock is generally suitably processed at a liquid hourly space velocity of from about 0.5 to about 20. Hydrodesulfurization catalysts preferably comprise a Group VI–B metal, usually molybdenum, and a Group VIII metal, usually nickel or cobalt, on a refractory inorganic oxide carrier material, usually alumina. The present invention is directed to an improved method of manufacturing an extruded catalyst composition, and in one of its broad aspects embodies a method which comprises commingling a refractoy inorganic oxide with a Group VI–B metal compound and a Group VIII metal compound, and with a minor portion of a peptizing agent; admixing the peptized product with an aqueous alkaline reagent and converting said product to an extrudable mass of finely divided particles, and extruding the same; drying the extrudate particles and calcining said particles at a temperature of from about 700° to about 1200° F. in an oxidizing atmosphere. The catalyst composition prepared in accordance with the method of this invention affords particular advantages with respect to the desulfurization of a residual fuel oil and the present invention further embodies a hydrodesulfurization process which comprises treating said oil in admixture with hydrogen and in contact with the described catalyst composition at a temperature of from about 200° to about 800° F. and at a hydrogen pressure of from about 100 to about 3000 p.s.i.g.

In accordance with the method of this invention, a refractory inorganic oxide gel is initially commingled with a Group VI–B metal compound and a Group VIII metal compound, and with a peptizing agent. It is within the scope of this invention to commingle the refractory inorganic oxide gel with the other components in any desired sequence. Thus, the peptizing agent can be commingled with the refractory inorganic oxide gel to effect peptization thereof in the manner hereinafter described, either before or after one or both of the Group VI–B or Group VIII metal compounds have been commingled therewith. Preferably, the refractory inorganic oxide gel is dry-mixed with the Group VI–B metal compound, and the blend thereafter treated in admixture with the peptizing agent—the Group VIII metal compound being subsequently admixed wth the peptized product. This last mentioned procedure has resulted in a catalyst composition of improved activity with respect to the hydrodesulfurization of residual fuel oils.

The refractory inorganic oxide gel employed herein may be an alumina gel, silica gel, zirconia gel, and the like, or composites thereof such as an alumina-silica cogel, alumina-zirconia cogel, etc. Alumina is a preferred refractory inorganic oxide-gel, particularly with respect to the hydrodesulfurization reaction herein contemplated, and the further description of the method of this invention is presented with respect thereto. However, it is understood that other refractory inorganic oxide gels can be employed in the practice of this invention. The alumina gel is preferably an alpha-alumina monohydrate of the boehmite structure, such as is produced by the hydrolysis of an aluminum alcoholate or alkoxide and commercially available in a substantially pure finely divided powdered form.

Peptizing agents useful in the present invention are those commonly described in the art for reverting gels to their sol form. Thus, the peptizing agent can be a weak acid such as formic acid, acetic acid, propionic acid, etc., although the stronger acids such as sulfuric acid, hydrochloric acid, and particularly nitric acid, are preferred. In any case, only sufficient peptizing agent is employed to revert the gel to a pliable plastic mass, the amount being insufficient to completely revert the gel to a colloidal sol. The peptizing treatment can be accomplished by placing the gel, preferably in admixture with the selected Group VI–B metal compound, in a suitable mechanical stirrer, and adding the peptizing agent thereto during the mixing operation.

The Group VI–B metal compound is preferably molybdic anhydride. Other suitable Group VI–B metal compounds, i.e., compounds of molybdenum, tungsten, and chromium, which can be employed include molybdic acid, ammonium molybdate, ammonium chromate, chromium acetate, chromous chloride, chromium nitrate, tungstic acid, etc. The amount of Group VI–B metal compound employed should be sufficient to yield a final catalyst composition comprising from about 4 to about 30 wt. percent of the Group VI–B metal.

The Group VIII metal compound is preferably cobalt carbonate. Other Group VIII metal compounds which may be employed, i.e., compounds of iron, nickel, cobalt, platinum, palladium, ruthenium, rhodium, osmium and iridium, include nickel nitrate, nickel sulfate, nickel chloride, nickel acetate, cobaltous nitrate, cobaltous sulfate, ferric nitrate, ferric sulfate, platinum chloride, palladium chloride, and the like. The Group VIII metal compound is employed in an amount to yield a final catalyst composition comprising from about 1 to about 10 wt. percent of the Group VIII metal. As heretofore stated, the Group VIII metal compound is preferably blended with the refractory inorganic oxide gel and Group VI–B metal compound after the gel has been peptized. Thus, in one preferred embodiment, an alumina monohydrate gel is dry-mixed with molybdic anhydride and the mixture peptized with nitric acid to a plastic mass prior to commingling cobalt carbonate therewith.

Pursuant to the present invention, the peptized product is blended or mulled with an aqueous alkaline reagent, suitably an aqueous solution of ammonium hydroxide, ammonium carbonate, and the like. The aqueous alkaline reagent is added to the peptized product in an amount to convert the same to a substantially neutralized mass of finely divided solids which can be extruded into particles of any desired size. Alternatively, the finely divided solids can be compressed into pills or pellets by conventional means, the finely divided solids reverting to a cohesive plastic mass upon the application of pressure. It is a convenient practice to blend the aforementioned Group VIII metal compound, e.g., cobalt carbonate, with the peptized product at the same time that the aqueous alkaline reagent is blended therewith, utilizing a common muller or other suitable mixing means.

The extruded catalyst composition is suitably dried for a period of from about 0.5 to about 8 hours or more at from about 212 to about 260° F. in a drying oven. The dried catalyst composite is thereafter oxidized in an oxygen-containing atmosphere, such as air, for a period of from about 1 to about 8 hours or more and at a temperature of from about 700° to about 1200° F. The catalyst composite is preferably oxidized to a stable state, e.g., until the catalyst composite attains a constant weight, to realize maximum hydrosulfurization activity.

The following examples are presented in illustration of the method of this invention and are not intended as an undue limitation on the generally broad scope of the invention as set out in the appended claims.

EXAMPLE I

In the manufacture of the extruded catalyst composition of this invention, 4500 grams of finely powdered alumina monohydrate was thoroughly dry mixed with 956 grams of a finely powdered molybdic anhydride. About 2450 grams of 12.86 wt. percent nitric acid was then added to the powdered blend in a muller, the mixture being converted to a pliable plastic mass. Thereafter, 199 grams of finely powdered cobalt carbonate was admixed with the blend simultaneously with 296 grams of 28 wt. percent aqueous ammonium hydroxide and 250 grams of water. The mixture was mulled for about 1 hour in the muller, the mixture being converted to an extrudable mass of finely divided particles. The mixture thus prepared was pressured through a 5/16" orifice, and the extrudate dried at about 225° F. for 3 hours. The dried extrudate particles were then calcined in air for 1 hour at 750° F., and for 1 hour at 1100° F.

EXAMPLE II

About 100 cubic centimeters (82.1 grams) of the catalyst was placed in a fixed bed of a vertical tubular reactor. A residual crude oil was charged down flow through the catalyst bed in a once-through type of operation at a liquid hourly space velocity of about 1.0 and in admixture was recycle hydrogen. The hydrogen was recycled to the reactor at the rate of approximately 5000 standard cubic feet per barrel of hydrocarbon charge stock. The residual crude oil charge stock had an initial boiling point of 650° F., an API gravity of 12.8 at 60° F. and a sulfur concentration of 3.69 weight percent. The charge stock was preheated, entering the catalyst bed at about 695° F. and at a hydrogen pressure of 2000 p.s.i.g. The catalyst peak temperature was 745° F. The reactor effluent was recovered in a high pressure separator, excess hydrogen being separated overhead, water-scrubbed and recycled to the reactor. The hydrotreated residual crude oil was recovered from the separator, charged to a stripper, and the stripped product recovered. After 16 hours on stream, the hydrotreated product analyzed 0.94 weight percent sulfur and had an API gravity of 20.2 at 60° F.

I claim as my invention:

1. A method of catalyst manufacture which comprises:
   mixing a major proportion of a refractory inorganic oxide gel with a Group VI–B metal compound and a Group VIII metal compound, and with a minor portion of an acidic peptizing agent in an amount sufficient to revert said gel to a pliable plastic mass but insufficient to completely revert the gel to a colloidal sol;
   admixing the peptized product with an aqueous alkaline reagent and converting said product to an extrudable mass of finely divided particles, and extruding the same;
   drying the extrudate particles and calcining said particles at a temperature of from about 700° to about 1200° F. in an oxidizing atmosphere;
   the proportions of said metal compounds being sufficient to yield a final catalyst composition containing about 4 to about 30 wt. percent Group VI–B metal and about 1 to about 10 wt. percent Group VIII metal.

2. The method of claim 1 further characterized in that said refractory inorganic oxide gel is alumina gel.

3. The method of claim 1 further characterized in that said peptizing agent is nitric acid.

4. The method of claim 1 further characterized in that said Group VI–B metal compound is a compound of molybdenum.

5. The method of claim 1 further characterized in that said Group VI–B metal compound is molybdic anhydride.

6. The method of claim 1 further characterized in that said Group VIII metal compound is a compound of cobalt.

7. The method of claim 1 further characterized in that said Group VIII metal compound is cobalt carbonate.

8. The method of claim 1 further characterized in that said aqueous alkaline reagent is aqueous ammonium hydroxide.

9. The method of claim 1 further characterized in that said refractory inorganic oxide is commingled with the Group VI–B metal compound and treated with the acidic peptizing agent prior to admixture with the Group VIII metal compound.

References Cited

UNITED STATES PATENTS

| | | | |
|---|---|---|---|
| 3,213,040 | 10/1965 | Pedigo | 252—465 |
| 3,075,915 | 1/1963 | Arnold | 208—216 |
| 2,952,644 | 9/1960 | Holden | 252—465 |
| 3,403,111 | 9/1968 | Colgan | 252—465 |
| 2,798,050 | 7/1957 | Gladrow | 252—466 |

DANIEL E. WYMAN, Primary Examiner

P. M. FRENCH, Assistant Examiner

U.S. Cl. X.R.

252—463, 458